US006883088B1

(12) United States Patent
Barry et al.

(10) Patent No.: US 6,883,088 B1
(45) Date of Patent: Apr. 19, 2005

(54) METHODS AND APPARATUS FOR LOADING A VERY LONG INSTRUCTION WORD MEMORY

(75) Inventors: Edwin Frank Barry, Vilas, NC (US); Gerald G. Pechanek, Cary, NC (US)

(73) Assignee: PTS Corporation, San Jose, CA (US)

( * ) Notice: Subject to any disclaimer, the term of this patent is extended or adjusted under 35 U.S.C. 154(b) by 0 days.

(21) Appl. No.: 10/758,348

(22) Filed: Jan. 15, 2004

Related U.S. Application Data

(62) Division of application No. 09/747,056, filed on Dec. 22, 2000, now Pat. No. 6,704,857.
(60) Provisional application No. 60/171,911, filed on Dec. 23, 1999.

(51) Int. Cl.[7] .............................................. G06F 15/00
(52) U.S. Cl. ......................... 712/215; 710/22; 710/23; 710/24; 710/25; 711/219; 712/24; 713/1
(58) Field of Search .............................. 710/22, 23, 24, 710/25, 26, 27, 28, 52, 53, 54, 55, 56, 57; 711/219; 712/24, 215, 205; 713/1

(56) References Cited

U.S. PATENT DOCUMENTS

| | | | | |
|---|---|---|---|---|
| 5,056,015 A | * | 10/1991 | Baldwin et al. | ............... 703/27 |
| 6,002,880 A | * | 12/1999 | Slavenburg | ................... 712/24 |
| 6,044,450 A | * | 3/2000 | Tsushima et al. | ............. 712/24 |
| 6,055,619 A | * | 4/2000 | North et al. | ................... 712/36 |
| 6,058,474 A | * | 5/2000 | Baltz et al. | ..................... 713/1 |
| 6,065,106 A | * | 5/2000 | Deao et al. | .................... 712/24 |
| 6,105,119 A | * | 8/2000 | Kerr et al. | .................. 711/219 |

* cited by examiner

*Primary Examiner*—Kim Huynh
*Assistant Examiner*—Alan Chen
(74) *Attorney, Agent, or Firm*—Priest & Goldstein, PLLC

(57) ABSTRACT

The ManArray processor is a scalable indirect VLIW array processor that defines two preferred architectures for indirect VLIW memories. One approach treats the VIM as one composite block of memory using one common address interface to access any VLIW stored in the VIM. The second approach treats the VIM as made up of multiple smaller VIMs each individually associated with the functional units and each individually addressable for loading and reading during XV execution. The VIM memories, contained in each processing element (PE), are accessible by the same type of LV and XV Short Instruction Words (SIWs) as in a single processor instantiation of the indirect VLIW architecture. In the ManArray architecture, the control processor, also called a sequence processor (SP), fetches the instructions from the SIW memory and dispatches them to itself and the PEs. By using the LV instruction, VLIWs can be loaded into VIMs in the SP and the PEs. Since the LV instruction is supplied by the SP through the instruction stream, when VLIWs are being loaded into any VIM no other processing takes place. In addition, as defined in the ManArray architecture, when the SP is processing SIWs, such as control and other sequential code, the PE array is not executing any instructions. Techniques are provided herein to independently load the VIMs concurrent with SIW or iVLIW execution on the SP or on the PEs thereby allowing the load latency to be hidden by the computation.

15 Claims, 12 Drawing Sheets

FIG. 4A

LV1- LOAD/MODIFY VLIW — 400

Encoding — 410

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | | Ctrl0p | | | 0 | UAF | | | | InstrCnt | | | 0 | 0 | SU | LU | ALU | MAU | DSU | Vb | 0 | VIMOFFS | | | | | | | |

411 {bits 7-0: VIMOFFS}

Syntax/Operation — 420

| Instruction | Operands | Operation |
|---|---|---|
| LV1.[SP] | V[01], VIMOFFS, InstrCnt, d=[SLAMD], F=[AMD] | (V[01]+VIMOFFS)[SU]  →disable if (d=S)<br>(V[01]+VIMOFFS)[LU]  →disable if (d=L)<br>(V[01]+VIMOFFS)[ALU] →disable if (d=A)<br>(V[01]+VIMOFFS)[MAU] →disable if (d=M)<br>(V[01]+VIMOFFS)[DSU] →disable if (d=D)<br><br>(V[01]+VIMOFFS)[UAF] →ALU if (F=A or F=·)<br>(V[01]+VIMOFFS)[UAF] →MAU if (F=M)<br>(V[01]+VIMOFFS)[UAF] →DSU if (F=D)<br><br>if (InstrCnt > 0)<br>  Load next InstrCnt instructions into<br>  (V[01]+VIMOFFS) |

FIG. 4B

XV1- EXECUTE VLIW — 425

Encoding:

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | S/P | Ctrl0p | | | VX | UAF | | 0 | 0 | 0 | 0 | 0 | 0 | 0 | SU | LU | ALU | MAU | DSU | Vb | 0 | VimOffs | | | | | | |

430 — bits 21..8; 431 — VimOffs bits 7..1

Syntax/Operation:

| Instruction | Operands | Operation |
|---|---|---|
| XV1.[SP] | V[01], VIMOFFS, E=(SLAMD), F=[AMDN] | Execute (V[01]+VIMOFFS)[SU] if (E=S)<br>Execute (V[01]+VIMOFFS)[LU] if (E=L)<br>Execute (V[01]+VIMOFFS)[ALU] if (E=A)<br>Execute (V[01]+VIMOFFS)[MAU] if (E=M)<br>Execute (V[01]+VIMOFFS)[DSU] if (E=DI)<br><br>(V[01]+VIMOFFS)[UAF] → ALU if (F= or F=A)<br>(V[01]+VIMOFFS)[UAF] → MAU if (F=M)<br>(V[01]+VIMOFFS)[UAF] → DSU if (F=DI) |

LV2- LOAD/MODIFY VIM- 2 — 455

Encoding — 450

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | | CtrlOp | | | 0 | LI | d | InstrCnt | | | | UnitVIM | | | 0 | 0 | 0 | 0 | 0 | Vb | 0 | VimOffs | | | | | | | |

Syntax/Operation — 460

| Instruction | Operands | Operation |
|---|---|---|
| LV2.[SP] | LI, u=UnitVIM, V[01], VIMOFFS, InstrCnt, d | if (LI=0) Load disable bit only disable bit @ (V[01]+VIMOFFS)[UnitVIM] ← d<br><br>if (LI=1) Load instructions disable bit @ (V[01]+VIMOFFS)[UnitVIM] ← d<br><br>Load next InstrCnt instructions into (V[01]+VIMOFFS)[UnitVIM] ← 1st Instruction following LV2<br><br>(V[01]+VIMOFFS+1)[UnitVIM] ← 2nd Instruction following LV2<br><br>...<br><br>(V[01]+VIMOFFS+InstrCnt)[UnitVIM] ← (InstrCnt+1)th Instruction following LV2<br><br>InstrCnt is a binary coded number, 0 thru F, that represents from 1 to 16 instructions that can be loaded into up to 16 consecutive UnitVIM locations |

FIG. 4D

XV2- EXECUTE VLIW — 475

Encoding

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Ctrlop | | | | UAF | | 0 | 0 | Vb | SOFS | | | | LOFS | | | | AOFS | | | | MOFS | | | | DOFS | | | |

470

Syntax/Operation

| Instruction | Operands | Operation |
|---|---|---|
| XV2.[SP] | V[01], SOFFS, LOFS, AOFS, MOFS, DOFS, F=[AMDN] | Execute {V[01]+SOFFS}[SU] if (d=0)<br>Execute {V[01]+LOFFS}[LU] if (d=0)<br>Execute {V[01]+AOFFS}[ALU] if (d=0)<br>Execute {V[01]+MOFFS}[MAU] if (d=0)<br>Execute {V[01]+DOFFS}[DSU] if (d=0)<br>Execute NOP @ {V[01]+unitOFS}[unit] if (d=1) |

… 1
METHODS AND APPARATUS FOR LOADING A VERY LONG INSTRUCTION WORD MEMORY

RELATED APPLICATIONS

This application is a divisional of U.S. Ser. No. 09/747,056 filed Dec. 22, 2000, now U.S. Pat. No. 6,704,857 which claims the benefit of U.S. Provisional Application Ser. No. 60/171,911 filed Dec. 23, 1999 both of which are incorporated by reference herein in their entirety.

FIELD OF THE INVENTION

The present invention relates generally to improvements in parallel processing, and more particularly to techniques for the loading of very long instruction word (VLIW) memory in an indirect VLIW processor which allows the load latency to be hidden by computation.

BACKGROUND OF THE INVENTION

An indirect VLIW processor is organized with a VLIW memory (VIM) that is separate from its short instruction word (SIW) memory. The VIM is defined for an instruction set architecture by way of specific SIWs that control the loading and execution of the VLIWs stored in the VIM. For example, a load VLIW (LV) instruction is defined which acts as a setup control delimiter instruction for the processor logic. The LV instruction specifies the VIM address where a VLIW is to be stored and the number of SIWs which follow the LV instruction that are to be stored at the specified VIM address in VLIW fashion. Another special SIW is the execute VLIW (XV) instruction. The XV instruction causes a VLIW to be read out of VIM at the XV specified address.

The ManArray processor defines two preferred architectures for indirect VLIW memories. One approach treats the VIM as one composite block of memory using one common address interface to access any VLIW stored in the VIM. The second approach treats the VIM as made up of multiple smaller memories each individually associated with the functional units and each individually addressable for loading and reading during XV execution. It will be recognized that improved techniques loading of VLIW memory will be highly desirable.

SUMMARY OF THE PRESENT INVENTION

The present invention covers techniques to independently load the VIMs concurrent with SIW or iVLIW execution on the SP or on the PEs thereby allowing the load latency to be hidden by the computation. The ManArray processor which is a scalable indirect VLIW array processor is the presently preferred processor for implementing these concepts. The VIM memories, contained in each processing element (PE), are accessible by the same type of LV and XV SIWs as in a single processor instantiation of the indirect VLIW architecture. In the ManArray architecture the control processor, also called the sequence processor (SP), fetches the instructions from the SIW memory and dispatches them to itself and the PEs. By using the LV instruction, VLIWs can be loaded into VIMs in the SP and the PEs. Since the LV instruction is supplied by the SP through the instruction stream, when VLIWs are being loaded into any VIM no other processing takes place. In addition, as defined in the ManArray architecture, when the SP is processing SIWs, such as control and other sequential code, the PE array is not executing any instructions. With the techniques presented herein, the latency to load the VIM can be hidden by the computation.

A more complete understanding of the present invention, as well as other features and advantages of the invention will be apparent from the following Detailed Description and the accompanying drawings.

BRIEF DESCRIPTION OF THE DRAWINGS

FIG. 4A illustrates an LV1 Load/Modify VLIW Instruction;

FIG. 4B illustrates an XV1 Execute VLIW Instruction;

FIG. 4C illustrates an LV2 Load/Modify Instruction;

FIG. 4D illustrates an XV2 Execute VLIW Instruction;

FIG. 6 illustrates aspects of an iVLIW LV2/XV2 pipeline apparatus;

DETAILED DESCRIPTION

The present invention may be applicable to a variety of processing and array designs; however, an exemplary and presently preferred architecture for use in conjunction with the present invention is the ManArray™ architecture. Further details of a presently preferred ManArray core, architecture, and instructions for use in conjunction with the present invention are found in U.S. patent application Ser. No. 08/885,310 filed Jun. 30, 1997, now U.S. Pat. No. 6,023,753, U.S. patent application Ser. No. 08/949,122 filed Oct. 10, 1997, now U.S. Pat. No. 6,167,502, U.S. patent application Ser. No. 09/169,255 filed Oct. 9, 1998, now U.S. Pat. No. 6,343,356, U.S. patent application Ser. No. 09/169,256 filed Oct. 9, 1998, now U.S. Pat. No. 6,167,501, U.S. patent application Ser. No. 09/169,072, filed Oct. 9, 1998, now U.S. Pat. No. 6,219,776, U.S. patent application Ser. No. 09/187,539 filed Nov. 6, 1998, now U.S. Pat. No. 6,151,668, U.S. patent application Serial No. 09/205,588 filed Dec. 4, 1998, now U.S. Pat. No. 6,173,389, U.S. patent application Ser. No. 09/215,081 filed Dec. 18, 1998, now U.S. Pat. No. 6,101,592, U.S. patent application Ser. No. 09/228,374 filed Jan. 12, 1999, now U.S. Pat. No. 6,216,223, U.S. patent application Ser. No. 09/238,446 filed Jan. 28, 1999, now U.S. Pat. No. 6,366,999, U.S. patent application Ser. No. 09/267,570 filed Mar. 12, 1999, now U.S. Pat. No. 6,446,190, U.S. patent application Ser. No. 09/337,839 filed Jun. 22, 1999 entitled "Efficient Complex Multiplication and Fast Fourier Transform (FFT) Implementation on the ManArray Architecture", U.S. patent application Ser. No. 09/350,191 filed Jul. 9, 1999, now U.S. Pat. No. 6,356,994, U.S. patent application Ser. No. 09/422,015 filed Oct. 21, 1999, now U.S. Pat. No. 6,408,382, U.S. patent application Ser. No. 09/432,705 filed Nov. 2, 1999, now U.S. Pat. No. 6,697,427. U.S. patent application Ser. No. 09/471,217 filed Dec. 23, 1999, now U.S. Pat. No. 6,260,082. U.S. patent application Ser. No. 09/472,372 filed Dec. 23, 1999, now U.S. Pat. No. 6,256,683, U.S. patent application Ser. No. 09/596,103 filed Jun. 16, 2000, now U.S. Pat. No. 6,397,324, U.S. patent application Ser. No. 09/598,567 entitled "Methods and Apparatus for Improved Efficiency in Pipeline Simulation and Emulation" filed Jun. 21, 2000, U.S. patent application Ser. No. 09/598,564 filed Jun. 21, 2000, now U.S. Pat. No. 6,622,238, U.S. patent application Ser. No. 09/598,566 filed Jun. 21, 2000, now U.S. Pat. No, 6,735,690, and U.S. patent application Ser. No. 09/598,084 filed June 21, 2000, now U.S. Pat. No. 6,654,870, and U.S. patent application Ser. No. 09/599,980 filed Jun. 22, 2000, now U.S. Pat. No. 6,748,517 all of which are assigned to the assignee of the present invention and incorporated by reference herein in their entirety.

Figure 1:
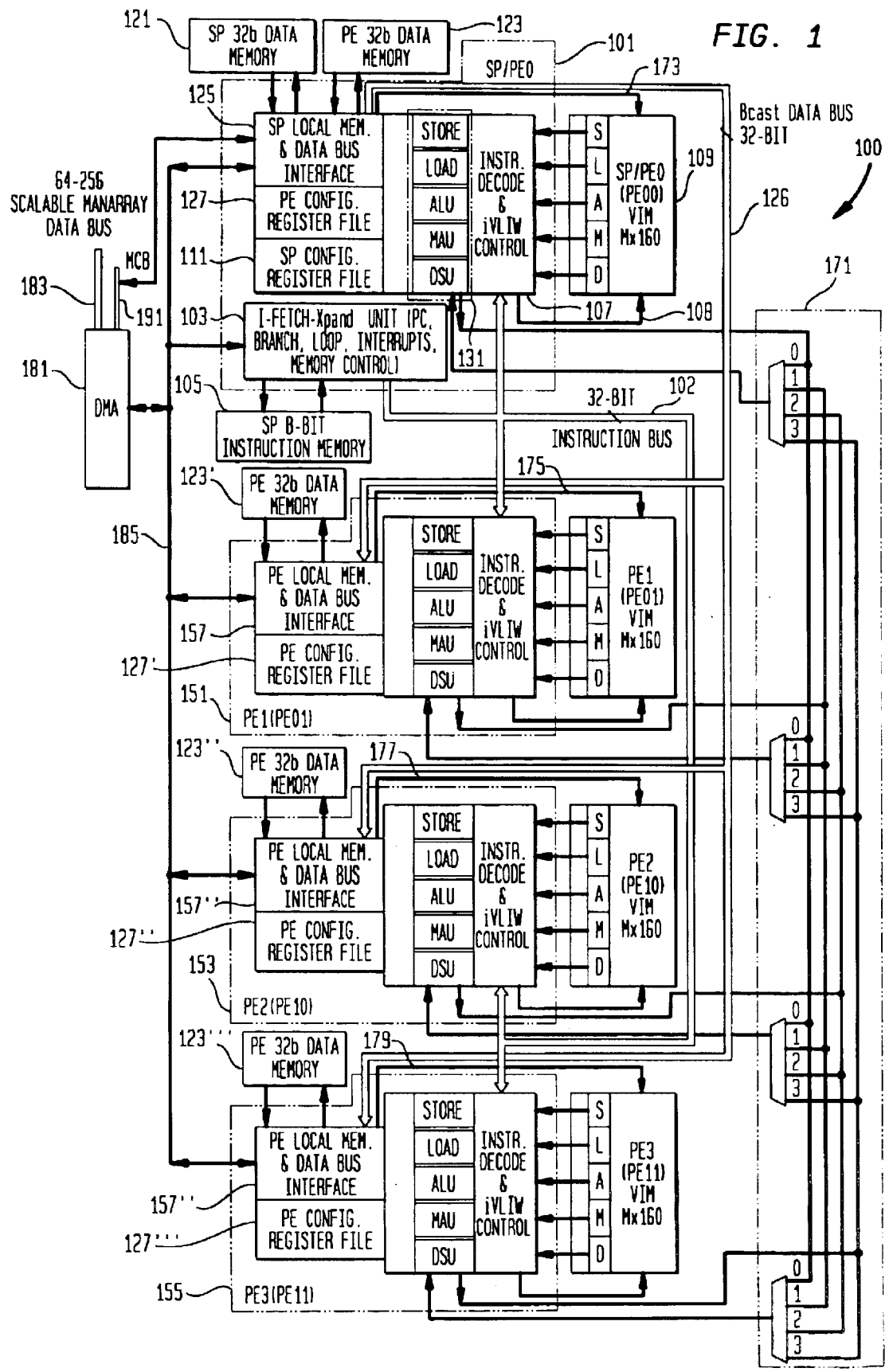
FIG. 1 illustrates aspects of ManArray indirect VLIW instruction memory in accordance with the present invention.

In a preferred embodiment of the present invention, a ManArray 2×2 iVLIW single instruction multiple data stream (SIMD) processor 100 illustrated in FIG. 1 is employed. Processor 100 includes a controller sequence processor (SP) combined with a processing element-0 (PE0) SP/PE0 101 as described in further detail in U.S. patent application Ser. No. 09/169,072 entitled "Methods and Apparatus for Dynamic Merging an Array Controller with an Array Processing Element". Three additional PEs 151, 153, and 155 are used to describe the DMA and other techniques of loading of VIM memories. The SP/PE0 101 contains a fetch controller 103 to allow the fetching of SIWs from a 32-bit instruction memory 105. The fetch controller 103 provides the typical functions needed in a programmable processor such as a program counter (PC), a branch capability, event point loop operations (for further details of such operations see U.S. Provisional Application Ser. No. 60/140,245 entitled "Methods and Apparatus for Generalized Event Detection and Action Specification in a Processor" filed Jun. 21, 1999), and support for interrupts. It also provides the instruction memory control which could include an instruction cache if needed by an application. In addition, the SIW I-Fetch controller 103 dispatches 32-bit SIWs to the other PEs in the system by means of a 32-bit instruction bus 102.

In this exemplary system, common elements are used throughout to simplify the explanation, although actual implementations are not limited to this restriction. For example, the execution units 131 in the combined SP/PE0 101 can be separated into a set of execution units optimized for the control function, for example, fixed point execution units, and the PE0 as well as the other PEs can be optimized for a floating point application. For the purposes of the present description, it is assumed that the execution units 131 are of the same type in the SP/PE0 101 and the PEs 151, 153 and 155. In a similar manner, SP/PE0 and the other PEs use a five instruction slot iVLIW architecture which contains a VLIW memory (VIM) 109 and an instruction decode and VIM controller function unit 107 which receives instructions as dispatched from the SP/PE0's I-Fetch unit 103 and generates the VIM addresses-and-control signals 108 required to access the iVLIWs stored in the VIM 109. The iVLIWs are identified by the letters SLAMD that reference the Store(S), Load (L), ALU (A), MAU (M), and DSU (D) execution units. The loading of the iVLIWs is described in further detail in U.S. patent application Ser. No. 09/187,539 entitled "Methods and Apparatus for Efficient Synchronous MIMD Operations with iVLIW PE-to-PE Communication". Also contained in the SP/PE0 and the other PEs is a common PE configurable register file (CRF) 127 which is described in further detail in U.S. patent application Ser. No. 09/169,255 entitled "Method and Apparatus for Dynamic Instruction Controlled Reconfiguration Register File with Extended Precision".

Due to the combined nature of the SP/PE0 101, the data memory interface controller 125 must handle the data processing needs of both the SP controller, with SP data in memory 121, and PE0, with PE0 data in memory 123. The SP/PE0 controller 125 also is the source of the data that is sent over the 32-bit or 64 bit broadcast data bus 126. The other PEs, 151, 153, and 155 contain common physical data memory units 123', 123", and 123'" though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is a cluster switch 171 described in further detail in U.S. patent application Ser. Nos. 08/885,310 entitled "Manifold Array Processor", 08/949,122 entitled "Methods and Apparatus for Manifold Array Processing", and 09/169,256 entitled "Methods and Apparatus for ManArray PE-to-PE Switch Control". The interface to a host processor, other peripheral devices, external memory or the like can be done in many ways. The primary mechanism shown for completeness is contained in a DMA control unit 181 that provides a scalable ManArray data bus 183 that connects to devices and interface units external to the ManArray core. The DMA control unit 181 provides the data flow and bus arbitration mechanisms needed for these external devices to interface to the ManArray core memories including the VIM via the multiplexed bus interface symbolically represented by line 185 and internal DMA interfaces 173, 175, 177, and 179. All of the above noted patents are assigned to the assignee of the present invention and incorporated herein by reference in their entirety.

Indirect Very Long Instruction Word (iVLIW) Architecture

Each SP/PE0 101 and each PE 151, 153, 155 in the ManArray architecture shown in FIG. 1 contains a quantity of iVLIW memory (VIM) 109. Each VIM 109 contains space to hold multiple VLIW Instructions, and each addressable VIM location is capable of storing up to eight short instruction words (SIWs). Current implementations allow each iVLIW instruction to contain up to five simplex instructions: one in each of the store unit (SU), load unit (LU), arithmetic logic unit (ALU), multiply-accumulate unit (MAU), and data-select unit (DSU). For example, an iVLIW instruction at some VIM address "i" contains the five instructions SLAMD as indicated in the VIM 109 of FIG. 1.

Figure 2:
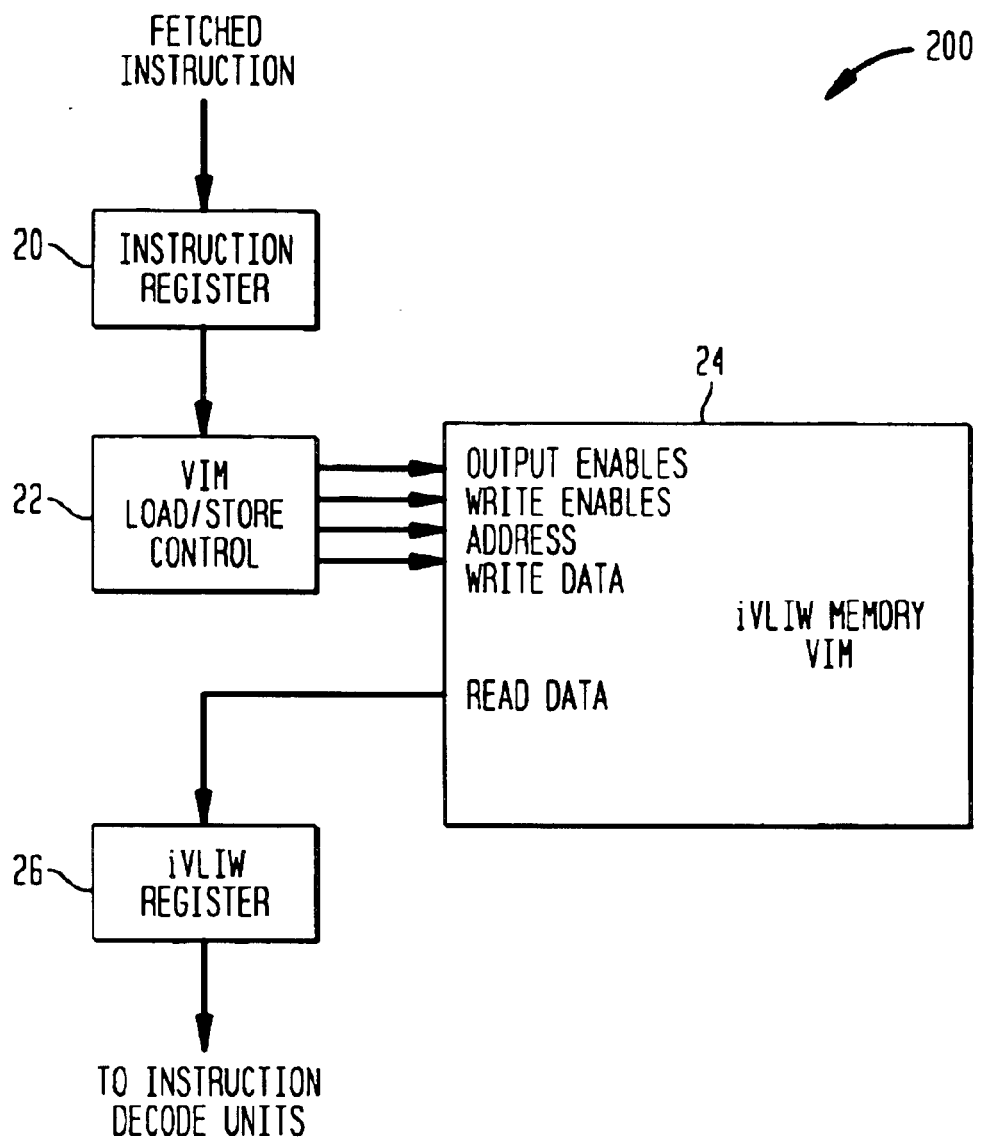
FIG. 2 illustrates the basic iVLIW Data Path.

FIG. 2 shows the basic iVLIW instruction flow execution path 200 in which a fetched instruction is stored in an instruction register 20 which is connected to a VIM load and store control functional unit 22. The VIM load and store control functional unit provides the interface signals to a VIM 24. The output of the VIM 24 is pipelined to an iVLIW register 26.

Figure 3:
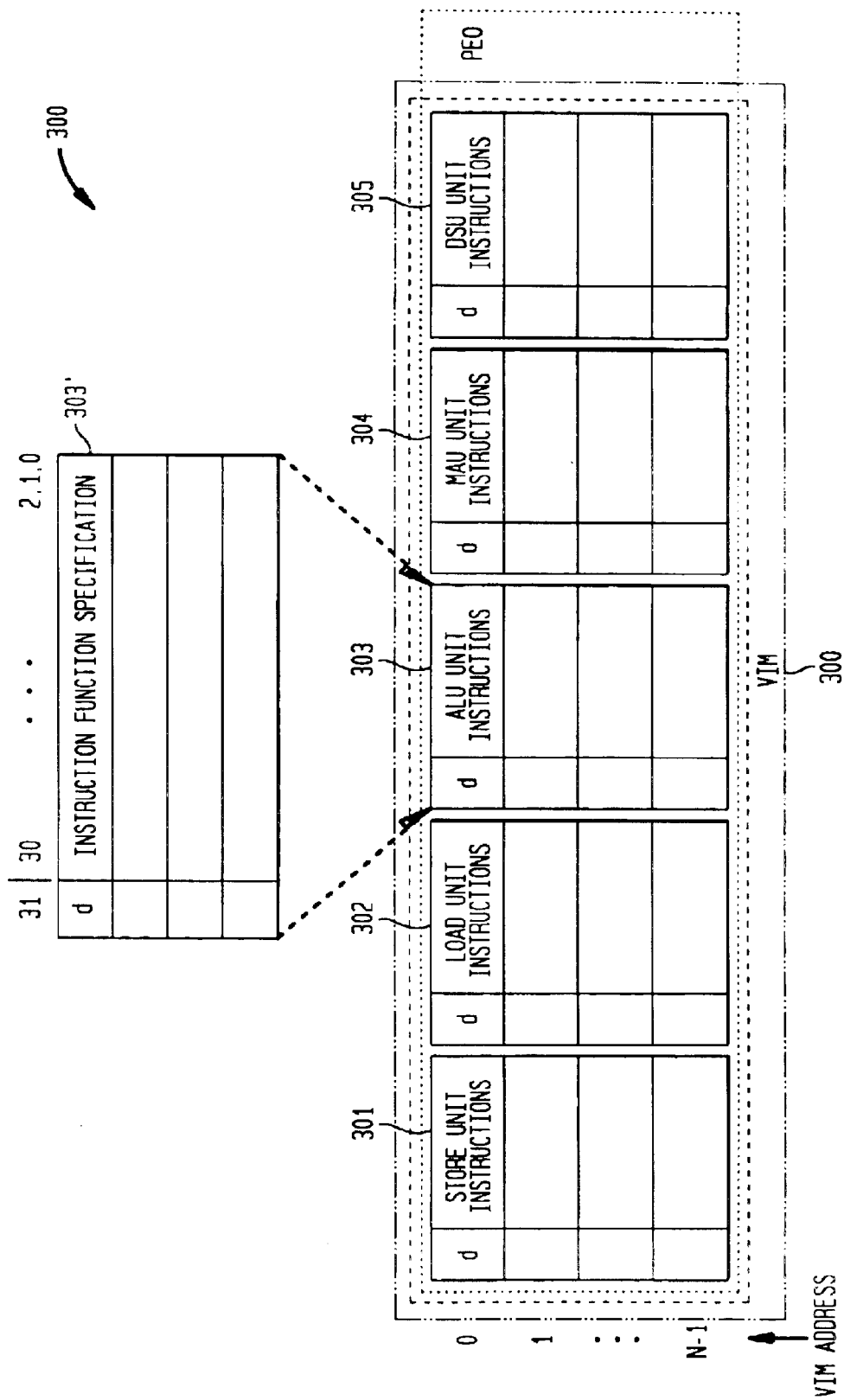
FIG. 3 illustrates a five slot iVLIW with an expanded view of the ALU slot.

FIG. 3 illustrates a five slot iVLIW VIM 300 with N entries. The expanded ALU slot view indicates a 32-bit storage space, though depending upon the implementation the specific number of bits required to represent an instruction can vary.

iVLIW instructions can be loaded into an array of PE VIMs collectively, or, by using special instructions to mask a PE or PEs, each PE VIM can be loaded individually. The iVLIW instructions in VIM are accessed for execution through the execute VLIW (XV) instruction, which when executed as a single instruction causes the simultaneous execution of the simplex instructions located at a specified VIM memory address.

Two basic instruction types are used to load/modify iVLIW memories, and to execute iVLIW instructions. They are:

1. Load/Modify VLIW Memory Address (LV1) instruction 400 shown in FIG. 4A, and

2. Execute VLIW (XV1) instruction 425 shown in FIG. 4B.

As shown in FIG. 4A, the LV1 instruction 400 is for 32-bit encodings as shown in illustrative encoding block 410. A presently preferred syntax/operation for this instruction is shown in syntax/operation block 420. The LV1 instruction 400 is used to load and/or disable individual instruction slots of the specified SP or PE VLIW Memory (VIM). The VIM address is computed as the sum of the base VIM address register Vb (V0 or V1) plus an unsigned 8-bit offset VIMOFFS shown in bits 0–7, the block of bits 411 of encoding block 410 of FIG. 4A. The VIM address must be in the valid range for the hardware configuration otherwise the operation of this instruction is undefined.

Any combination of individual instruction slots may be disabled via the disable slot parameter 'd={SLAMD}, where S=store unit (SU), L=load unit (LU), A=arithmetic logic unit (ALU), M=multiply-accumulate unit (MAU), and D=data select unit (DSU). A blank 'd='parameter does not disable any slots. An instruction loaded into a slot marked by the disable slot parameter remains disabled when loaded.

The number of instructions to be loaded are specified utilizing an InstrCnt parameter. For the present implementation, valid values are 0–5. As specified by this parameter, the number instructions next following the LV1 are loaded into the specified VIM address. Further operational description of the load VLIW instruction can be found in U.S. patent application Ser. No. 09/187,539.

The XV1 instruction 425 shown in FIG. 4B is also for 32-bit encoding as shown in illustrative encoding block 430. A presently preferred syntax/operation for this instruction is shown in syntax/operation block 435. The XV1 instruction 425 is one of a control group of instructions defined by group field bits 30 and 31 of encoding block 410, and is used to execute individual instruction slots of the specified SP's or PE's, as specified by bit 29, VLIW memory (VIM). The VIM address is computed as the sum of a base VIM address register Vb (V0 or V1) plus an unsigned 8-bit offset VIMOFFS shown in bits 0–7, the block of bits 431 in encoding block 430 of FIG. 4B. The VIM address must be in the valid range for the hardware configuration otherwise the operation of this instruction is undefined. Further operational description of the execute VLIW instruction is also found in the above mentioned application.

Figure 5:
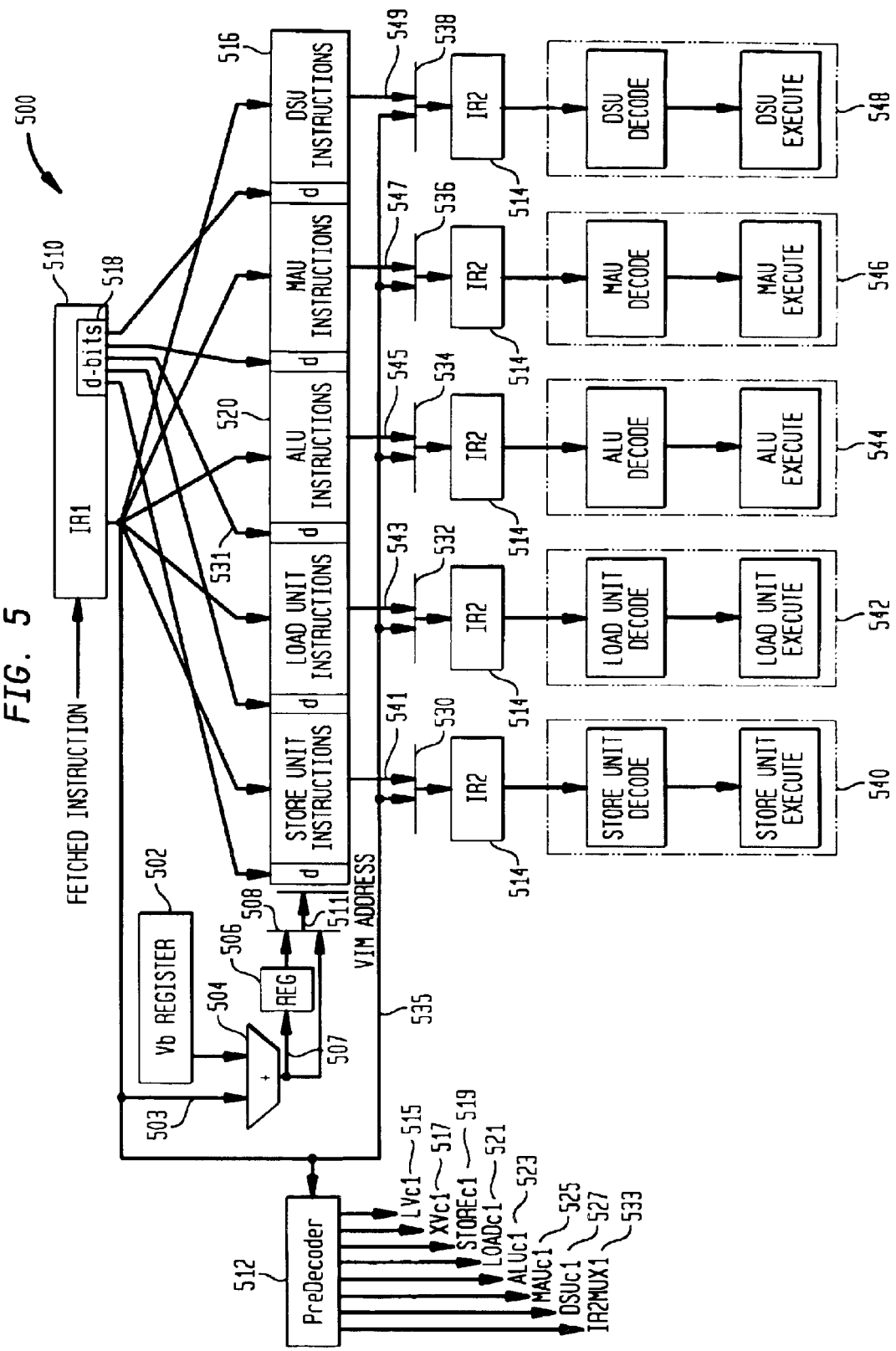
FIG. 5 illustrates aspects of an iVLIW LV1/XV1 pipeline apparatus.

LV1 and XV1 operations in accordance with the present invention are discussed with reference to FIG. 5 where aspects of the iVLIW load and fetch pipeline are described in connection with an iVLIW system 500. Among its other aspects, FIG. 5 shows a selection mechanism for allowing selection of instructions out of VIM memory. A fetched instruction is loaded into instruction register 1 (IR1) 510. Register 510 corresponds generally with instruction register 20 of FIG. 2. The output of IR1 is predecoded by predecoder 512 early in the pipeline cycle prior to loading values into instruction register 2 (IR2) 514. When the instruction in IR1 is a load iVLIW (LV1) with a non-zero instruction count, the predecoder 512 generates the LVc1 control signals 515, which are used to set up the LV1 operation cycle. The VIM address 511 is calculated by use of the specified Vb register 502 added by adder 504 with the offset value included in the LV1 instruction via path 503. The resulting VIM address 511 is stored in register 506 and passed through multiplexer 508 to address the VIM 516. VIM 516 corresponds generally to VIM 109 of FIG. 1.

Register 506 is required to hold the VIM address 507 during the LV1 operations. The VIM address 511 and LV1 control state allows the loading of the instructions received after the LV1 instruction into the VIM 516. At the end of the cycle in which the LV1 was received, the disable bits 10–17 shown in FIG. 4A are loaded into a d-bits register 518 for use when loading instructions into the VIM 516. Upon receipt of the next instruction in IR1 510, which is to be loaded into VIM 516, the appropriate control signal is generated depending upon the instruction type, Storec1 519, Loadc1 521, ALUc1 523, MAUc1 525, or DSUc1 527. The operation of predecoder 512 is based upon a simple decoding of the group bits (bits 30 and 31 of FIGS. 4A–D) which define the instruction type shown in FIGS. 4A–D, a Load/Store bit, and the unit field (bits 27 and 28) of an ALU, MAU, or DSU type instruction. By using this predecode step, the instruction in IR1 510 can be loaded into VIM 516 in the proper functional unit position.

For example, when an ADD instruction included in the LV1 list of instructions is received into IR1 510, it can be determined by the predecoder 512 that the ADD instruction is to be loaded into the ALU Instruction slot 520 in VIM 516. In addition, the appropriate d-bit 531 for that functional slot position is loaded into bit-31 of that slot. The loaded d-bit occupies one of the group code bit positions from the original instruction.

Upon receipt of an XV1 instruction in IR1 510, the VIM address 511 is calculated by use of the specified Vb register 502 added by adder 504 with the offset value included in the XV1 instruction via path 503. The resulting VIM Address 507 is passed through multiplexer 508 to address the VIM. The iVLIW at the specified address is read out of the VIM 516 and passes through the multiplexers 530, 532, 534, 536, and 538, to the IR2 registers 514. As an alternative to minimize the read VIM access timing critical path, the output of the VIM can be latched into a register whose output is passed through a multiplexer prior to the decode state logic.

For XV1 execution, an IR2MUX1 control signal 533 in conjunction with the predecode XVc1 control signal 517 cause all the IR2 multiplexers, 530, 532, 534, 536, and 538, to select the VIM output paths, 541, 543, 545, 547, and 549. At this point, the five individual decode and execution stages of the pipeline, 540, 542, 544, 546, and 548, are completed in synchrony providing iVLIW parallel execution performance. To allow a single 32-bit instruction to execute by itself in the PE or SP, the bypass VIM path 535 is shown. For example, when a simplex ADD instruction is received into IR1 510 for parallel array execution, the predecoder 512 generates the IR2MUX1 533 control signal, which in conjunction with the instruction type predecode signal 523 in the case of an ADD, and lack of an XV 517 or LV 515 active control signal, causes the ALU multiplexer 534 to select the bypass path 535.

An alternative VIM configuration exists for within slot compression mechanism. This mechanism is described in further detail in U.S. patent application Ser. No. 09/205,558. In this approach, the VIM is divided up into separate VIM sections each associated with corresponding functional decode-and-execute units. Each of the VIMs' address maps are divided into multiple 4-bit addressable sections as governed by an offset field included in a new version of the execute iVLIW instruction, XV2, with a separate offset that can be specified for each VIM slot section. This VIM configuration and XV2 addressing option provides the ability to independently select instructions within each VIM slot 4-bit address range. By doing this, duplicate SIWs within the 16 addressable iVLIW range can be eliminated providing greater packing of SIWs within the composite VIM.

The XV2 instruction is similar to the XV1 instruction in that it is used to modify, enable/disable sub-iVLIW instructions, and indirectly execute iVLIW instructions in the SP and PEs but does so in a different way than the XV1 instruction. For the XV2 instruction, it is still assumed that the iVLIWs have been loaded into this new partitioned VIM by use of a new version of the load VLIW instruction, LV2 455 shown in FIG. 4C. The LV2 encoding 450 consists of a CtrlOp field, bits 25–28, that represent the LV2 instruction opcode. A load instruction bit-23 specifies if at least one instruction is to be loaded or if the disable d-bit for the specified address is to be loaded. Bit-22 is the disable d-bit that is loaded. Bits 18–21 specify that up to 16 instructions are to be loaded in the specified functional unit's VIM, as specified by bits 15–17, beginning at the address specified by one of the Vb registered addresses, as selected by bit-9, plus the VIMOFFS offset address, bits 0–7. Presently preferred syntax/operation details are shown in syntax/operation table 460.

An XV2 instruction 475 is shown in FIG. 4D. The encoding format 470 includes new bit fields as follows. UAF field bits 23 and 24 are not optional on XV2 instruction 475 and must be specified with each XV2 use. The VIM base register selection Vb is established by bit 20, and the five offset fields are store VIM offset (SOFS) bits 16–19, load VIM offset (LOFS) bits 12–15, ALU VIM offset (AOFS) bits 8–11, MAU VIM offset (MOFS) bits 4–7, and DSU VIM offset (DOFS) bits 0–3. The presently preferred syntax/operation is shown in syntax/operation table 480.

Figure 6:
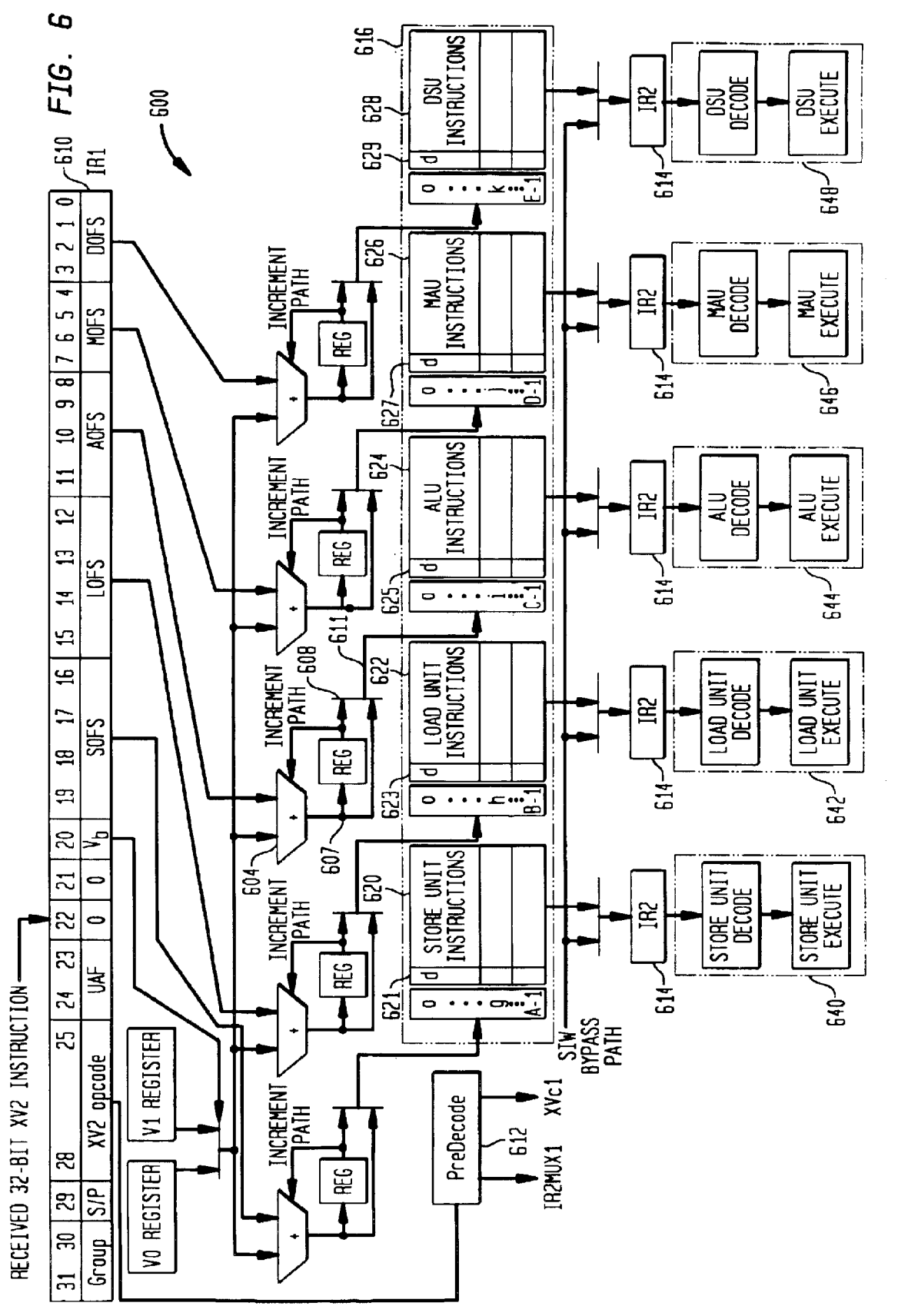

Referring to FIG. 6, VIM 616 consists of multiple independent memory units each associated with their functional decode and execute units. Independent addressing logic is provided for each slot VIM. As illustrated in FIG. 6, each VIM entry preferably consists of five SIW slots (one per execution unit) and associated with each SIW slot are additional state bits, of which 5 are shown (one d-bit per slot). Included among the five execution units are a store unit 640 associated with store instruction VIM 620, load unit 642 associated with load instruction VIM 622, an arithmetic-logic unit (ALU) 644 associated with ALU instruction VIM 624, a multiply accumulate unit (MAU) 646 associated with MAU instruction VIM 626, and a data select unit (DSU) 648 associated with DSU instruction VIM 628.

The FIG. 6 VIM address adder functional blocks, as exemplified by ALU VIM address adder 604, are different than the adder functional block 504 as shown in FIG. 5 in order to support the VIM address increment capability required by the load VLIW-2 (LV2) instruction 455 of FIG. 4C as described in the syntax/operation block 460. This capability allows the instructions following the LV2 instruction to be loaded at:

(V[01]+VIMOFFS)[UnitVIM]←1$^{st}$ Instruction following LV2

(V[01]+VIMOFFS+1)[UnitVIM]←2$^{nd}$ Instruction following LV2

.
.
.

(V[01]+VIMOFFS+InstrCnt)[UnitVIM]←(InstrCnt+1)$^{th}$ Instruction following LV2

The instruction count parameter InstrCnt is a binary coded number, 0 thru F, that represents from 1 to 16 instructions that can be loaded into up to 16 consecutive UnitVIM locations.

The five state d-bits 621, 623, 625, 627, and 629 are LV-loaded disable bits for the instruction slots that indicate either: the SIW slot is available-for-execution or it is not-available-for-execution. A binary value suffices to distinguish between the two states. An instruction slot with its d-bit set to the not-available-for-execution state is interpreted as an NOP (no-operation) instruction by the execution unit. In addition, the appropriate d-bit for that functional slot position is loaded into bit-31 of that slot.

ManArray DMA Background

The ManArray PEs 101, 151, 153, 155 of FIG. 1 each have their own local memories 123, 123', 123", and 123''', respectively. These PE local memories are accessible from a program through use of the PE load and store instructions. PE local memories may also be accessed by the DMA controller for data transfers to and from other system memories. The DMA controller 181 accesses a PE local memory bank only when the PE does not require access to the particular port requested by the DMA. This access approach is termed "cycle borrowing" since the processor is never stalled for DMA access. PE0 which shares its load and store units with the SP behaves like any other PE with respect to its local memory accesses.

Type-1 VIM DMA

Figure 7:
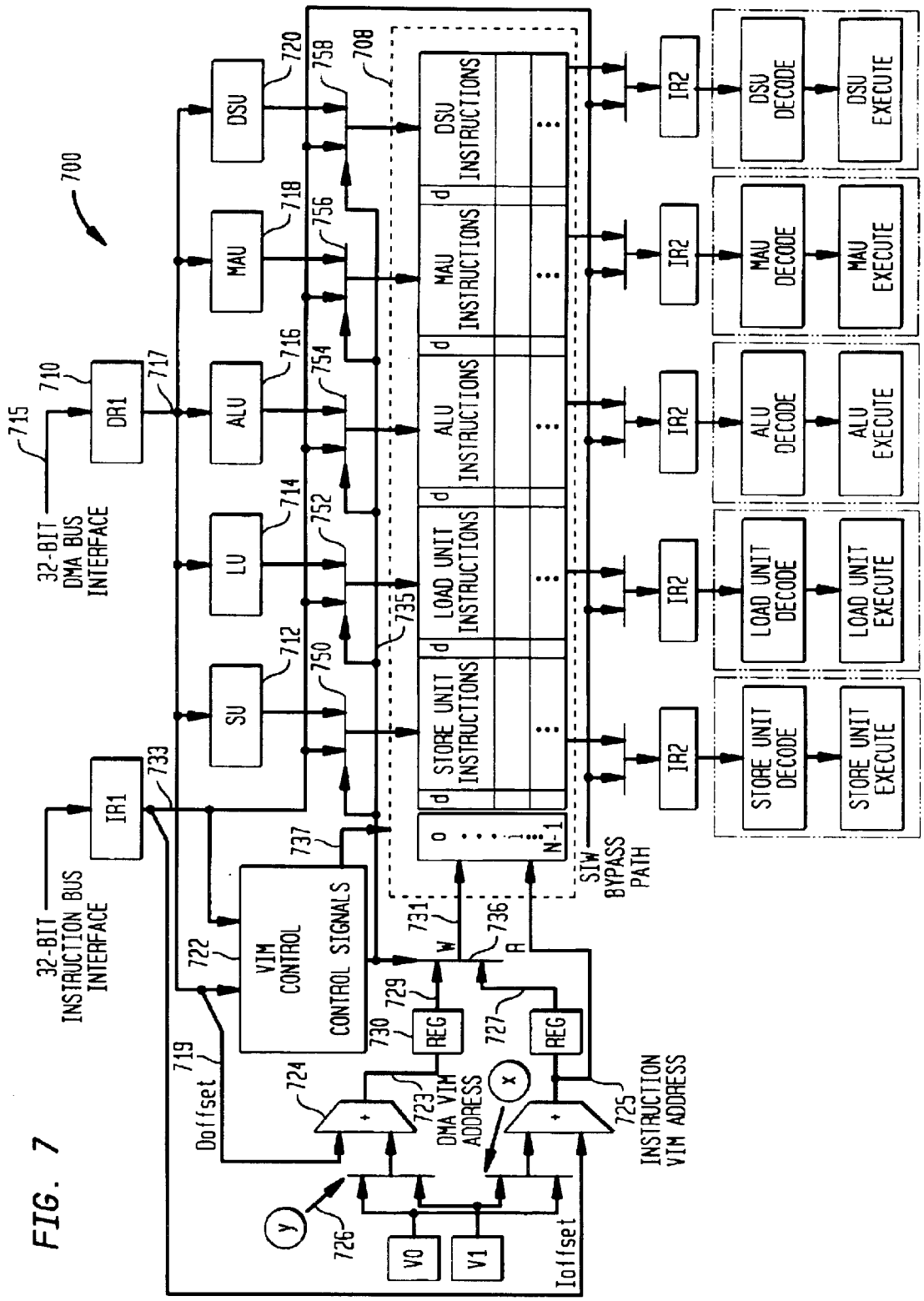
FIG. 7 illustrates a Type-1 VIM DMA apparatus.

FIG. 7 depicts a type-1 VIM DMA apparatus 700 with type-1 VIM 708 similar to the type-1 VIM apparatus 500 and VIM 516 shown in FIG. 5, but with the addition of DMA control apparatus as shown in FIG. 7. The type-1 VIM DMA apparatus represents an extension to the basic DMA memory interface provided in each PE. The "cycle borrowing" technique is also used in VIM DMA operations. The preferred VIM 708 is a two port memory allowing simultaneous read and write accesses. It is anticipated that in applications where performance is not critical or where simultaneous read and write accesses are deemed not necessary that a single shared read/write port VIM can be used. In the two port design, each port requires its own address and write or read control signals. A write address 731 is sourced from multiplexer 736 since the VIM can be loaded from either instruction path 727 with LV1 instructions or from DMA operations on path 729. Read address 725 is only accessed from the instruction side under control of XV1 instructions. The DMA operation consists of a "data" packet made up of SIWs that begin with an LV1 type instruction, followed by the SIWs constituting the VLIW to be loaded at the address specified in the LV1 instruction. Multiple VLIW packets can be loaded into VIM during a single VIM DMA request with each packet optionally varying in size depending upon the number of SIWs contained in each VLIW.

Operation is as follows. The "data" packet, when the DMA operation begins, is transferred beginning with the LV1 "data" item over the 32-bit DMA bus 715 and stored into DMA Register 1 (DR1) 710. The output 717 of DR1 is provided to the VIM controller 722 which provides "cycle borrow" control to the DMA interface. The received LV1 instruction causes the correct Vx base address register to be selected via path 726 and adder 724 adds the base Vx value to the offset found in the received LV1 OFFSET field 719 which is labeled Doffset. The resultant sum is stored in register 730 for later use. A programmer can use the two Vx base address registers V0 and V1 to aid this process where one, say register V0, can be set up for the instruction iVLIW usage and the other, register V1, for DMA base address use. The DMA packet will continue sending the next LV1 SIWs one at a time through DR1 710 to be loaded into the correct slot position DMA register for the SU 712, LU 714, ALU 716, MAU 718, and DSU 720. At this point, the full VLIW "data" packet has been loaded into the PEs and the VIM controller 722 can allow the VLIW to be loaded at the LV1 specified address as long as the instruction side does not take priority. The VIM controller 722 selects the multiplexer 736 to the DMA VIM address 729 and selects the multiplexers 750–758 to the VMA registers and in a single cycle the full VLIW is then loaded into the VIM. The DMA interface is then allowed to proceed with the next VLIW "data" packet if there is one.

Type-2 VIM DMA

Figure 8:
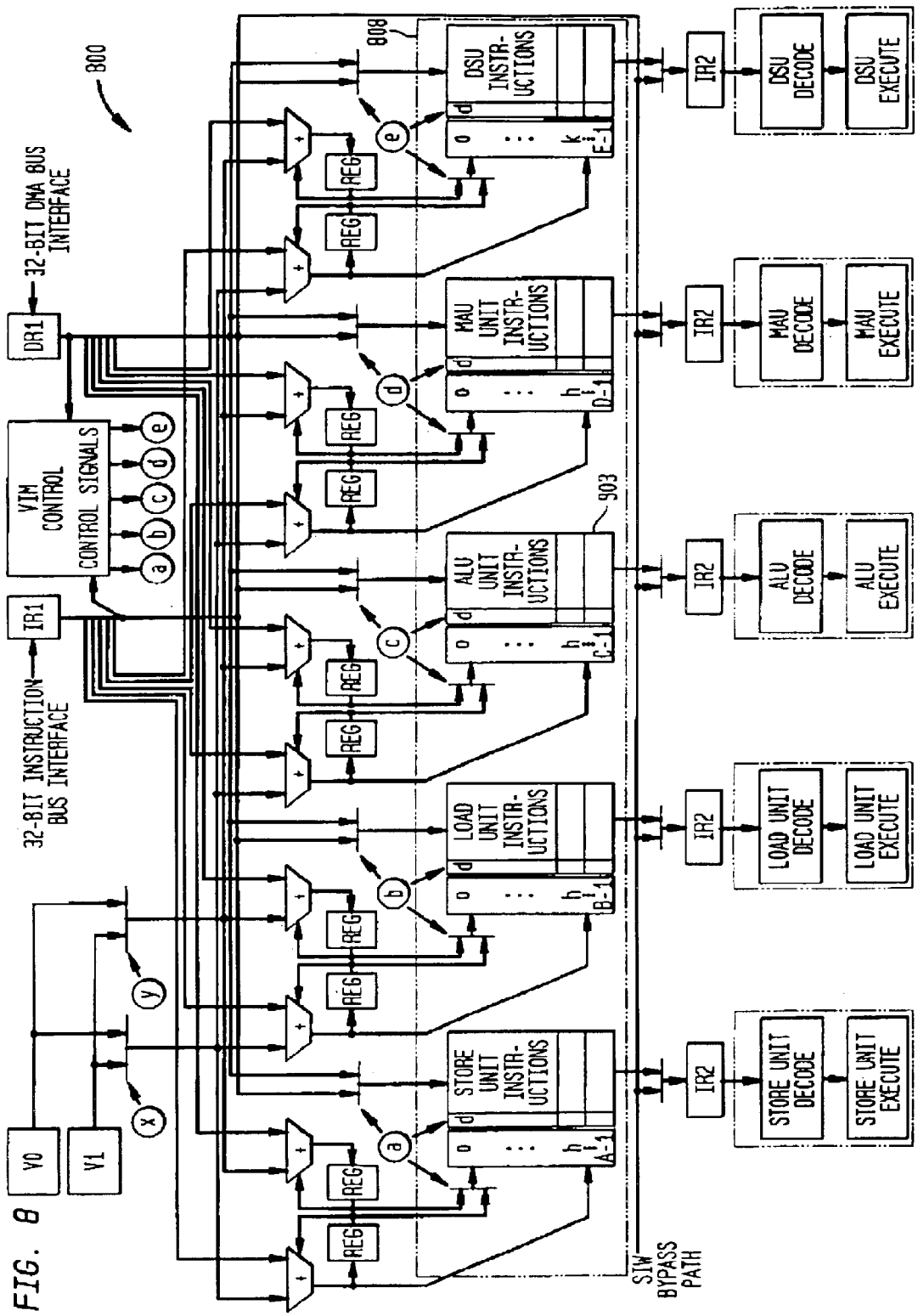
FIG. 8 illustrates a Type-2 VIM DMA apparatus.
Figure 9:
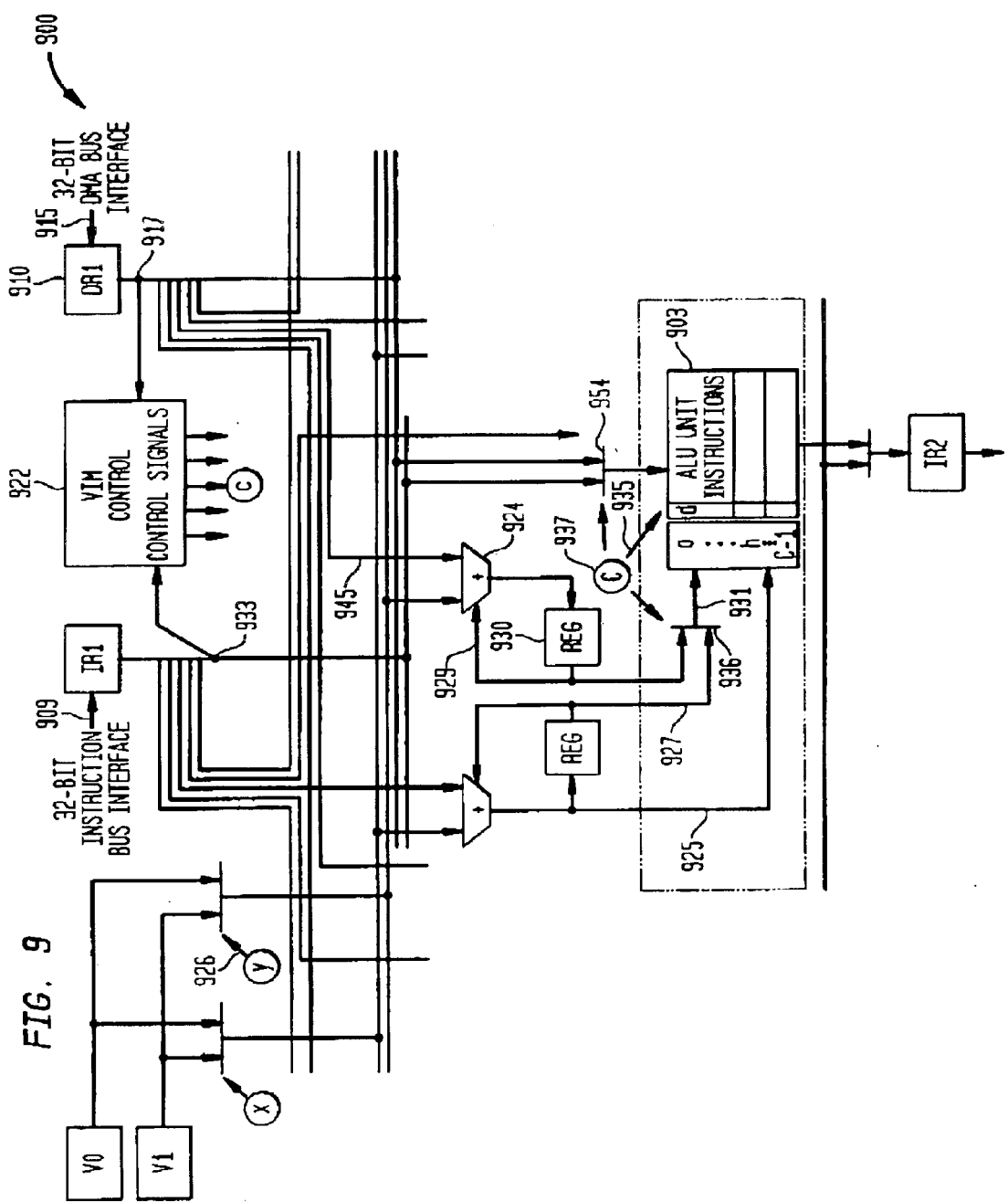
FIG. 9 illustrates a Type-2 VIM DMA-ALU portion apparatus.

FIG. 8 illustrates a type-2 VIM DMA apparatus 800 with a type-2 VIM 808 similar to the type-2 VIM apparatus 600 and VIM 616 shown in FIG. 6, but with the addition of DMA apparatus as shown in FIG. 8. In FIG. 8, the VIM is partitioned into a VIM section per functional unit each with duplicate controls and each operated in the same manner. Due to the complexity of FIG. 8, the ALU VIM portion and its associated controls have been broken out and shown in further detail in FIG. 9 for further detailed discussion of its operation. In FIG. 9 the assembly 900 processes the instruction 909 and utilizes a DMA 915 interface and ALU VIM 903 and control inputs from a controls section of the type-2 VIM system. The type-2 VIM DMA apparatus represents an extension to the basic DMA memory interface provided in each PE. The "cycle borrowing" technique is also used in VIM DMA operations. Each preferred VIM portion, for example VIM portion 903, is a two port memory allowing simultaneous read and write accesses. It is anticipated that in applications where performance is not critical or where simultaneous read and write accesses are deemed not necessary a single shared read/write port VIM can be used.

In the two port design, each port requires its own address and write or read control signals. The write address 931 is sourced from multiplexer 936 since the VIM can be loaded from either instruction path 927 with LV2 instructions or from DMA operations on path 929. The read address 925 is only accessed from the instruction side under control of XV2 instructions. DMA operation consists of a "data" packet made up of SIWs that begin with a LV2 type instruction, followed by the SIWs constituting the specified functional VIM portion to be loaded at the address specified in the LV2 instruction. The type-2 VIM differs from the type-1 VIM in that type-2 functional VIM portions are loaded up to 16 locations at a time while the type-1 VIM loads a single VIM address with the up to 5 SIWs constituting the single VLIW. The type-1 VIM DMA also buffered up a whole VLIW line of SIWs prior to loading the full VLIW in a single cycle to the specified VLIW address. In the type-2 VIM apparatus, it is important to note that the whole block of SIWs for each VIM portion gets loaded prior to that range of VIM addresses which are used by the XV2 instructions. This load priority is necessary because the XV2 instruction allows SIWs to be selected from the different functional VIM portions at different VIM addresses in parallel. The DMA subsystem would be scheduled to transfer a whole block of VIM data for all functional VIM portions. In this manner, the programmer can determine that when the type-2 DMA operation is complete all portions of the VIM are available for program use. The type-2 VIM DMA operation would transfer a single SIW at a time and not buffer up a full VLIW set of multiple SIWs as was done in the type-1 VIM DMA operation.

When this type2 VIM DMA operation begins, the "data" packet is transferred beginning with the LV2 "data" item over the 32-bit DMA bus 915 and stored into DMA register 1 (DR1) 910. The output 917 of DR1 is provided to VIM controller 922 which provides "cycle borrow" control to the DMA interface. The received LV2 instruction causes the correct Vx base address register to be selected via path 926 and adder 924 adds the base Vx value to the offset found in the received LV2 unit VIM offset field 945 (FIG. 4C bits 7–0 for the ALU defined by bits 17–15). The resultant sum is stored in register 930 for later use. A programmer can use the two Vx base address registers to aid this process where one, say register V0, can be set up for the instruction iVLIW usage and the other, register V1, for DMA base address use. The DMA packet will continue sending the next LV2 SIWs one at a time through DR1 910 to be loaded into the ALU VIM portion. For each SIW received at 910, the SIW is loaded directly into the ALU VIM portion under control of the VIM control 922 at the LV2 instruction specified address for the first SIW and then incrementally as long as the instruction side does not take priority. The DMA VIM control logic automatically increments the VIM address in preparation for the next SIW received on the DMA interface. The VIM controller 922 selects multiplexer 936 for the DMA VIM address 929 and selects the multiplexer 954 to the DR1 register output 917 and in a single cycle the SIW is then loaded into the ALU VIM 903. The DMA interface is then allowed to proceed with the next SIW "data" item of the DMA packet if there is one. It is noted that if the "data" packet is common to multiple PEs, the multiple PEs' functional VIM portions can be loaded in parallel and in synchronism. The DMA operation continues for each functional partition of the full Type-2 VIM apparatus.

Alternate VIM Load Mechanisms via SP or PE Instructions

Two alternate methods for loading VIMs (other than DMA):

(1) SP/PE Store to Special Purpose Register (SSPR) instructions to a specified VIM Port SPR address; and (2) an SPIPE Load instruction which targets the VPORT MRF register.

Both of these approaches have the following features:

Different LOAD (memory) addresses allow different VLIWs to be loaded into each VIM to support synchronous multiple instruction multiple data (SMIMD) processing setup.

It is not necessary to use instruction memory for LV instructions.

LV instructions can be placed into PE local memories by DMA using both channels for reducing overall VIM load time. DMA can place LV instructions into PE memories in background and VIMs can be loaded in ¼ the time required currently when application needs them.

These approaches also allow the SP or the PEs to reload VIMs while processing other instructions by use of the VLIW architecture.

Another method for loading VIMs in parallel is via PE SSPR instructions. The PE SSPR instruction is basically a variation of the STORE instruction. The SSPR instruction targets a particular address. VLIW instructions (LV followed by a list of instructions) can be loaded into PE memories via DMA, then a LOAD to a PE or SP register followed by an SSPR instruction to a VPORT PE SPR address can be used to load PE VIMs in parallel. This approach has several benefits.

The Load/SSPR data (LV and following instructions) would normally be targeting the instruction register of each PE in the present ManArray architecture, thereby conflicting with subsequent instructions in the pipe. This conflict is solved by providing an alternate decode register (same as with DMA) which would allow an LV instruction with following data to be decoded in parallel with any other instruction received from the instruction bus. With XVs, this approach requires a dual port VIM. In this approach, loads/ stores in an XV can be used to load VIMs with effective throughput of 4 instructions per cycle.

Interrupts must be disabled while VIMs are being loaded. Currently, interrupts are not allowed while processing an LV sequence. In the present architecture, the SP knows what is going on since it decodes the LV instruction. In this approach, there is no signal for PEs writing to a special "VIM load port" using a particular PE SPR address. One solution is to add a signal that is asserted whenever a value is written to the VIM Write Port SPR address of any PE or whenever the VPORT input register (of any PE) has data in it for loading into VIM.

While the present invention has been disclosed in a presently preferred context, it will be recognized that the present teachings may be adapted to a variety of contexts consistent with this disclosure and the claims that follow.

We claim:

1. A long instruction word (VLIW) memory (VIM) direct memory access (DMA) apparatus comprising:
   a plurality of VLIW slot function units;
   a partitioned VLIW memory (VIM) having a separate VIM section per VLIW slot function unit, each separate VIM section having a plurality of memory locations for storing slot function unit instructions;
   a DMA interface receiving a data packet having a plurality of short instruction words (SIWs); and
   a VIM load controller for selecting a separate VIM section and selectively controlling the loading of at least one SIW from the received plurality of SIWs into the selected separate VIM section.

2. The apparatus of claim 1 wherein each separate VIM section has two ports allowing simultaneous read and write accesses.

3. The apparatus of claim 1, wherein said plurality of SIWs comprises:
   a load/modify VLIW (LV2) SIW specifying a separate VIM section, a number of slot function SIWs (SFSIWs) to be loaded constituting a block of SFSIWs, and a starting address of the block of SFSIWs where the SFSIWs are to be loaded in the specified separate VIM section; and
   at least one SFSIW associated with the LV2 SIW.

4. The apparatus of claim 3 wherein the SFSIWs associated with the LV2 instruction are individually loaded into the specified separate VIM section.

5. A method for providing direct memory access (DMA) loading of a partitioned very long instruction word (VLIW) memory (VIM), said method comprising the steps of:
   receiving a DMA data packet having a plurality of short instruction words (SIWs);
   utilizing a VIM load controller for separately controlling the loading of each separate VIM section in a partitioned (VIM), the partitioned VIM having a separate VIM section per VLIW slot function unit; and
   selectively routing at least one SIW from the received plurality of SIWs to a separate VIM sections by the VIM load controller.

6. The method of claim 5 wherein each separate VIM section has two ports allowing simultaneous read and write accesses, and the method further comprises the step of separately providing each of the two ports each separate VIM section a read address, a write address, and associated read and write control signals.

7. The method of claim 5 further comprising the step of receiving a plurality of data packets, each data packet comprising a load/modify VLIW (LV2) SIW, and at least one (slot function SIW) (SFSIW) associated with the LV2 SIW, the LV2 SIW specifying a separate VIM to be loaded at an address specified by the LV2 SIW.

8. A very long instruction word (VLIW) memory (VIM) direct memory access (DMA) apparatus comprising:
   a plurality of functional execution units, each functional execution unit performing a distinct operation;
   a VLIW memory (VIM) having a plurality of VIM sections, each VIM section storing short instructions words (SIWs) corresponding to one of the plurality of functional execution units, each Vim section associated with one of the plurality of functional execution units, each stored SIW being selectable from any VIM section for parallel execution with any other stored SIW associated with a different functional execution unit of the plurality functional execution units;
   a DMA interface for receiving a data packet having a plurality of SIWs associated with a VIM section; and
   a VIM load controller for separately controlling the loading of at least one SIW of the received plurality of SIWs into a separate VIM section.

9. The apparatus of claim 8 wherein each of the plurality of VIM sections has two ports allowing simultaneous read and write accesses.

10. The apparatus of claim 8 wherein said plurality of SIWs comprises:
    a load/modify VLIW (LV2) SIW specifying a separate VIM section, a number of slot function SIWs (SFSIWs) to be loaded constituting a block of SFSIWs, and a starting address of the block of SFSIWs where the SFSIWs are to be loaded in the specified separate VIM section; and
    a plurality of SFSIWs associated with the LV2 SIW.

11. A method for loading very long instruction word (VLIW) memory (VIM) through a direct memory access (DMA) controller, said method comprising:
    providing a VLIW memory (VIM) having a plurality of VIM sections, each VIM section storing short instruction words (SIWs) corresponding to a functional execution unit of a plurality of functional execution units, each stored SIW selectable from any VIM section for parallel execution with any other stored SIW associated with a different functional execution unit;
    receiving a data packet having a plurality of SIWs associated with a VIM section; and
    selectively loading SIWs of the received plurality of instructions the VIM section associated with the received data packet utilizing a VIM load controller.

12. The method of claim 11 wherein each separate VIM section has two ports allowing simultaneous read and write accesses, and the method further comprises:
    separately providing each of the two ports for each separate VIM section a read address, a write address, and associated read and write control signals.

13. The method of claim 11 further comprising:
    receiving a plurality of data packets, each data packet comprising a load/modify VLIW memory (LV2) short instruction word (SIW) and a plurality of (slot function SIWs) (SFSIWs) associated with the LV2 SIW, wherein the selectively loading step loads each VIM section sequentially, for each data packet, wherein the LV2 SIW specifies the separate VIM section and the starting address of each VIM section is determined by fields contained in the LV2 SIW.

14. A very long instruction word (VLIW) memory (VIM) direct memory access (DMA) apparatus comprising:
    a plurality of functional execution units;
    a partitioned VIM having a plurality of VIM sections, each VIM section storing short instruction words (SIWs) corresponding to one of a plurality of functional execution units;
    a local data memory for storing a DMA data packet having at least one SIW associated with a VIM section; and
    a VIM load instruction specifying an operation that causes at least one DMA data packet SIW to be read from the local data memory and be loaded in a specified VIM section.

15. The apparatus of claim 14 wherein the VIM load instruction further specifies a start address associated with the DMA data packet and a number of instructions in a data packet.

* * * * *